United States Patent
Fujita et al.

(10) Patent No.: US 6,909,688 B2
(45) Date of Patent: Jun. 21, 2005

(54) OPTICAL PICKUP FOR FIXING A HALF MIRROR TO A PREDETERMINED POSITION

(75) Inventors: Kenichi Fujita, Osaka (JP); Suehiro Harada, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 445 days.

(21) Appl. No.: 10/143,884

(22) Filed: May 14, 2002

(65) Prior Publication Data

US 2002/0191525 A1 Dec. 19, 2002

(30) Foreign Application Priority Data

May 15, 2001 (JP) .................................... P 2001-144854

(51) Int. Cl.[7] ............................................. G11B 7/135
(52) U.S. Cl. ............................. 369/112.19; 369/112.29
(58) Field of Search ....................... 369/112.19, 112.16, 369/112.29

(56) References Cited

U.S. PATENT DOCUMENTS

| 4,719,614 | A | * | 1/1988 | Leterme et al. | ........ 369/112.21 |
| 5,296,988 | A | * | 3/1994 | Fujino | ................ 360/110 |
| 2002/0118628 | A1 | * | 8/2002 | Tachikawa et al. | .... 369/112.29 |
| 2003/0165108 | A1 | * | 9/2003 | Ito | ................ 369/112.16 |

FOREIGN PATENT DOCUMENTS

JP 3-4977 Y2 2/1991

* cited by examiner

Primary Examiner—Brian E. Miller
Assistant Examiner—Peter Vincent Agustin
(74) Attorney, Agent, or Firm—Morgan, Lewis & Bockius LLP (57) ABSTRACT

A pocket 10 is formed in a bottom surface 2a of a groove portion 2 in such a manner as to oppose a rear surface 3a of a half mirror 3, and an adhesive-injecting recessed passage 11 extending from the pocket 10 to an open end of the groove portion 2 is formed in the bottom surface 2a of the groove portion 2. Further, the bottom of the pocket 10 is closed by a positioning base 12 which is formed on the bottom surface 2a of the groove portion 2 to abut against the rear surface 3a of the half mirror 3, and a pair of protrusions 14 are formed which extend from the open end of the groove portion 2 to the positioning base 12 along both side edges of the adhesive-injecting recessed passage 11.

6 Claims, 6 Drawing Sheets

FIG.8  *Prior Art*

OPTICAL PICKUP FOR FIXING A HALF MIRROR TO A PREDETERMINED POSITION

BACKGROUND OF THE INVENTION

The present invention relates to an optical pickup for use in a disk player such as a DVD or CD, and more particularly concerns a technique which makes it possible to reliably fix a half mirror to a predetermined position on a housing by a simple arrangement.

Figure 1:
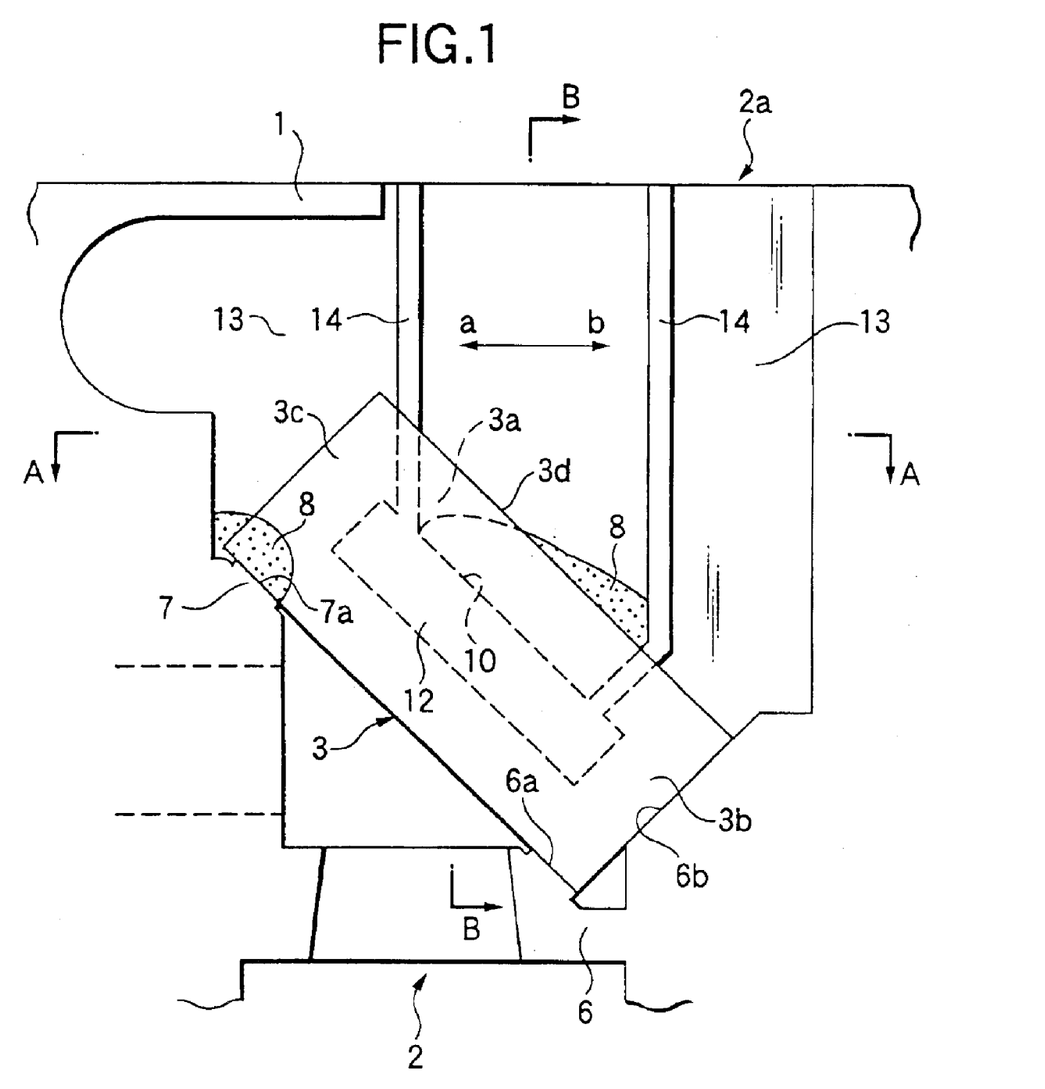
FIG. 1 is an enlarged front elevational view illustrating essential portions of an optical pickup in accordance with an embodiment of the invention.
Figure 2:
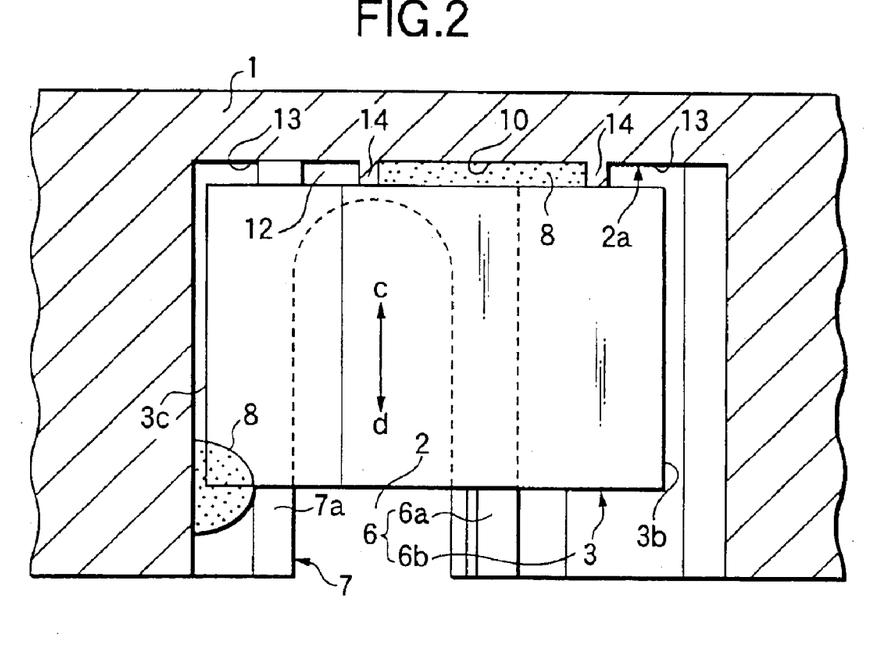
FIG. 2 is a view taken in the direction of arrows along line A—A in FIG. 1.
Figure 3:
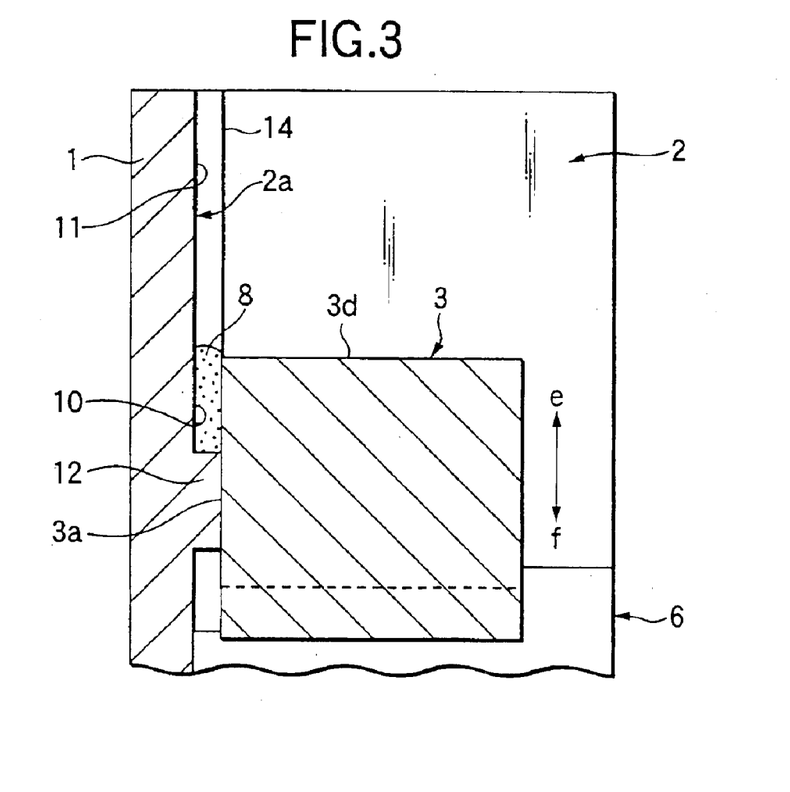
FIG. 3 is a view taken in the direction of arrows along line B—B in FIG. 1.
Figure 4:
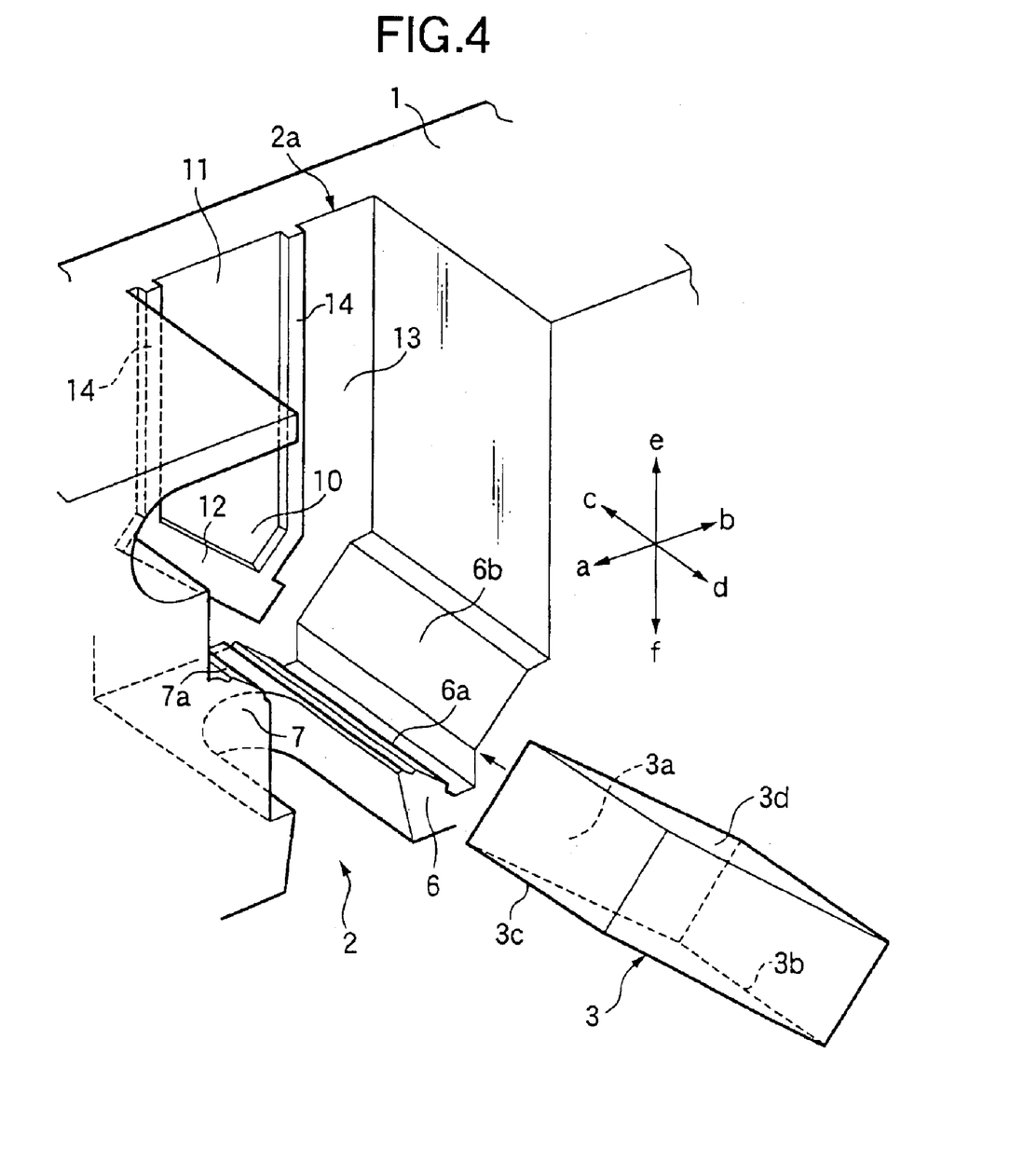
FIG. 4 is an exploded perspective view of the essential portions.
Figure 5:
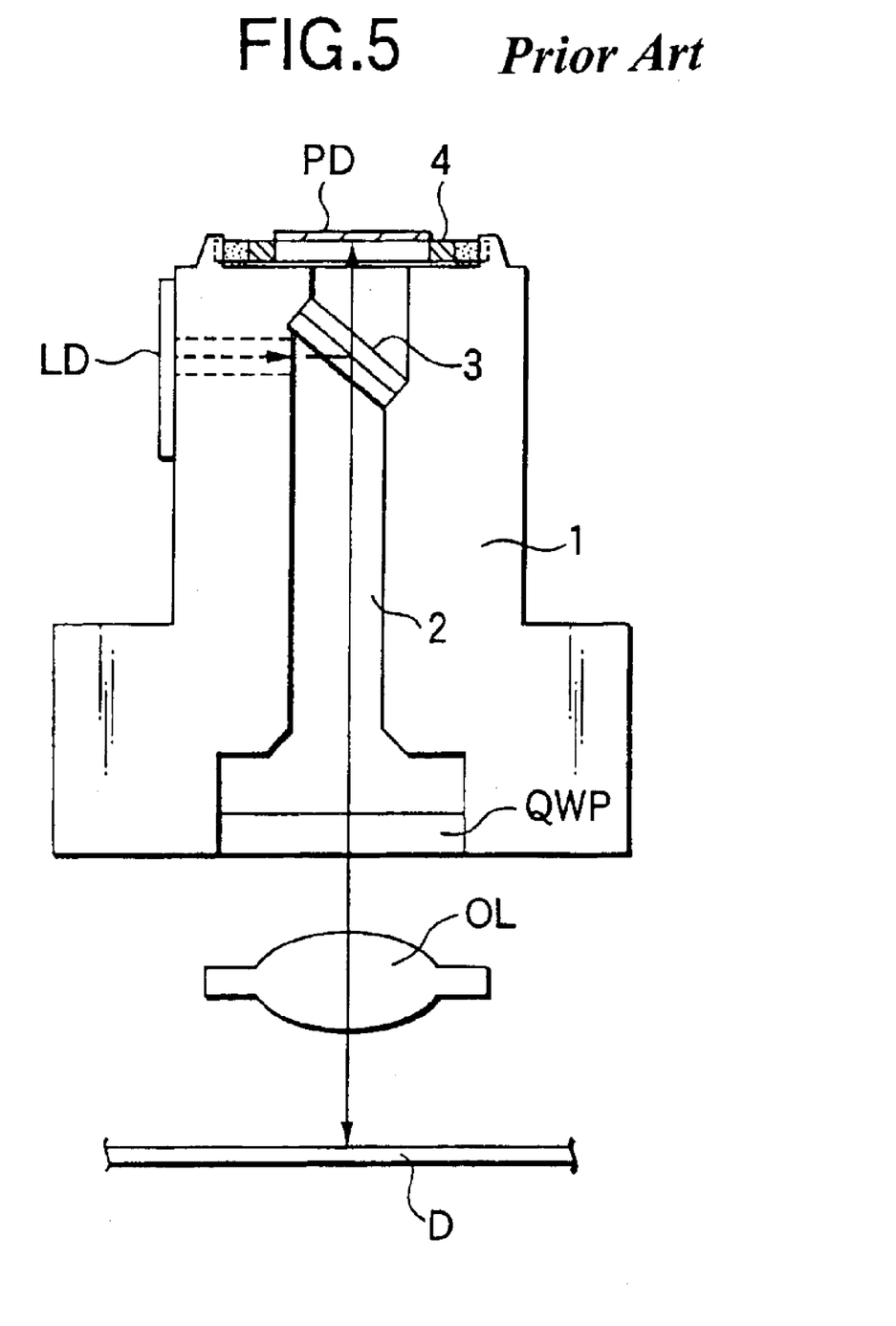
FIG. 5 is a schematic vertical cross-sectional view illustrating the principle of the optical pickup.

As an example of an optical pickup, one shown in FIG. 5 is known. In this optical pickup, a half mirror 3 is disposed in an inclined state midway in a groove portion 2 formed in a housing 1, and an objective lens OL and a collimator lens QWP, on one hand, and a chip 4 with a photodiode PD, on the other hand, are respectively disposed at both ends of the housing 1 with the half mirror 3 disposed therebetween. A semiconductor laser LD is provided on a side surface of the housing 1. An arrangement is provided such that laser light is projected onto a disk D from the semiconductor laser LD through the half mirror 3, the collimator lens QWP, and the objective lens OL, and the light reflected therefrom is received by the photodiode PD, thereby reading information recorded in the disk D.

Figure 6:
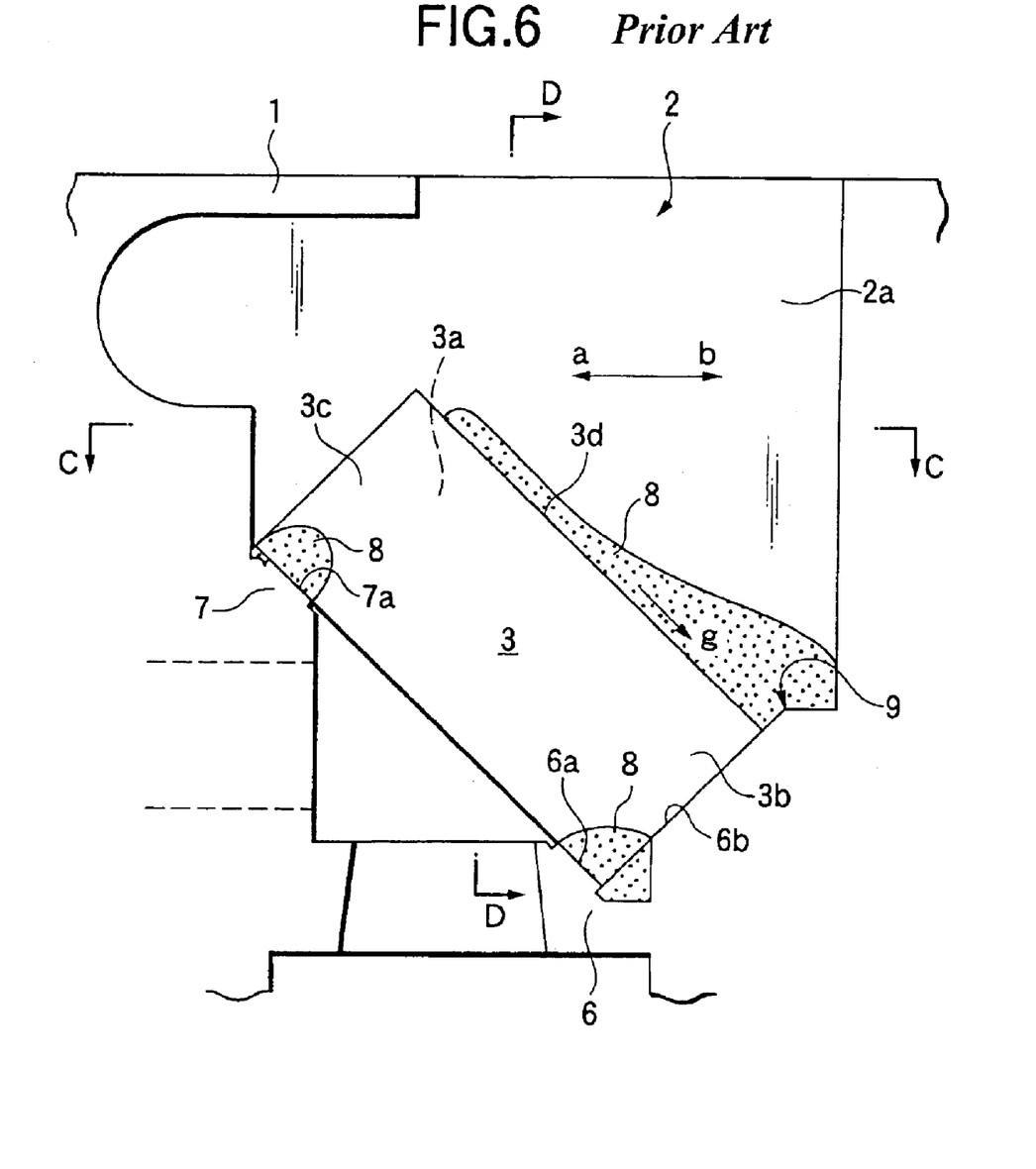
FIG. 6 is an enlarged front elevational view illustrating a conventional example.
Figure 7:
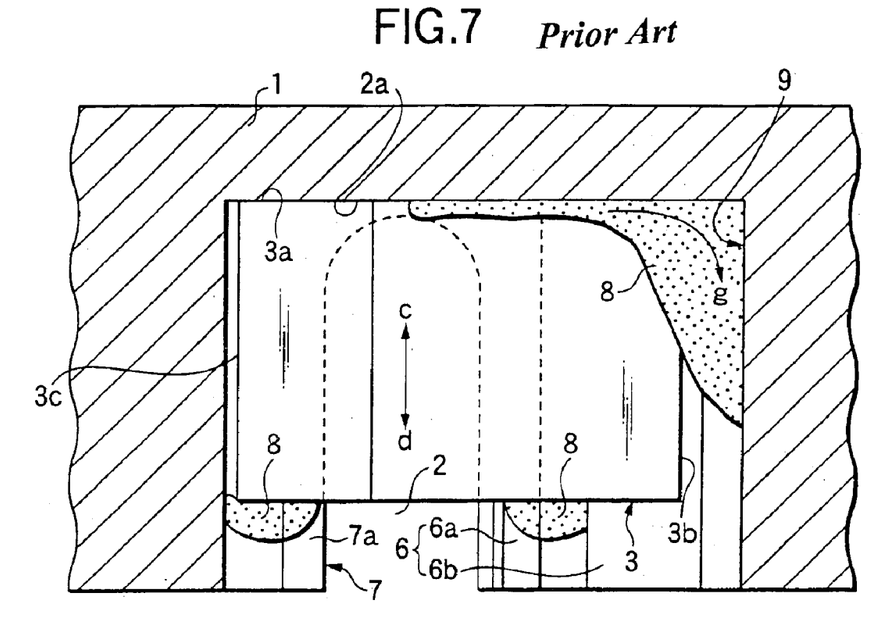
FIG. 7 is a view taken in the direction of arrows along line C—C in FIG. 6.
Figure 8:
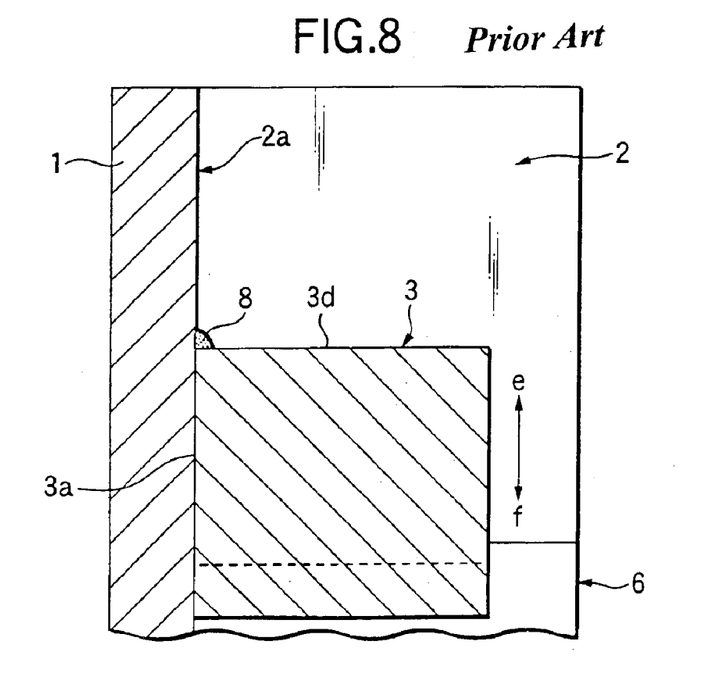
FIG. 8 is a view taken in the direction of arrows along line D—D in FIG. 6.

As shown in FIGS. 6 to 8, a retaining seat 6 having an inclined side surface 6a and an inclined end surface 6b, which are disposed in such a manner as to oppose each other in an L-shape, is formed on one side surface of the groove portion 2. Meanwhile, a positioning seat 7 having an inclined side surface 7a, which is flush with the inclined side surface 6a of the retaining seat 6, is formed on the other side surface of the groove portion 2.

As shown in FIGS. 6 to 8, the half mirror 3 has a rectangular block shape, a rear surface 3a of the half mirror 3 is made to abut against a bottom surface 2a of the groove portion 2, and one end portion 3b thereof is made to abut against the inclined side surface 6a and the inclined end surface 6b of the retaining seat 6, while the other end portion 3c thereof is made to abut against the inclined side surface 7a of the positioning seat 7. Thus the half mirror 3 is disposed in such a manner as to diagonally traverse the groove portion 2.

As a technique for fixing the half mirror 3, one disclosed in the Examined Japanese Utility Model Application Publication No. Hei3-4977 and the like is conventionally known. One of its examples will be described with reference to FIGS. 6 to 8. In this example, an ultraviolet curing adhesive 8 is applied to three spots between the rear surface 3a of the half mirror 3 and the bottom surface 2a of the groove portion 2 and between each of both end portions 3b and 3c of the half mirror 3 and each of the seats 6 and 7, and ultraviolet rays are applied thereto to cure the adhesive 8. The half mirror 3 is thereby fixed so as not to move unexpectedly in the left-and-right directions a and b, back-and-forth directions c and d, and vertical directions e and f.

In the above-described conventional arrangement, the half mirror 3 is bonded at three spots by the adhesive 8, and since the amount of the adhesive 8 applied to each spot is difficult to be set to a fixed amount or less, the amount of bonding becomes large. Accordingly, there is a possibility that the half mirror 3 is pulled by the shrinking force due to the curing of the adhesive 8 and becomes offset from its predetermined position.

In addition, since the half mirror 3 is placed in the inclined state, the adhesive 8 applied between the rear surface 3a of the half mirror 3 and the bottom surface 2a of the groove portion 2 is likely to flow down at a position g along an upper surface 3d of the half mirror 3. For this reason, the bonding of the rear surface 3a of the half mirror 3 and the bottom surface 2a of the groove portion 2 is likely to become insufficient. Further, the adhesive 8 which flowed down along the upper surface 3d is accumulated in a relatively large amount in a recessed portion 9 between the half mirror 3 and the groove portion 2, so that there is a possibility that the half mirror 3 is pulled by the shrinking force due to the curing of the accumulated adhesive 8 and becomes offset from its predetermined position.

SUMMARY OF THE INVENTION

In view of the above-described conventional drawbacks, the object of the invention is to provide an optical pickup which makes it possible to reliably fix the half mirror to a predetermined position on the housing by a simple arrangement.

To attain the above object, the invention according to aspect 1 is characterized in that a retaining seat having an inclined side surface and an inclined end surface, which are disposed in such a manner as to oppose each other in an L-shape, is formed on one side surface of a light-passing groove portion provided in a housing, and a positioning seat having an inclined side surface, which is flush with the inclined side surface of the retaining seat, is formed on another side surface of the groove portion, that one end portion of a half mirror is made to abut against the inclined side surface and the inclined end surface of the retaining seat, while another end portion of the half mirror is made to abut against the inclined side surface of the positioning seat, so as to dispose the half mirror in such a manner as to diagonally traverse the groove portion, that a pocket is formed in a bottom surface of the groove portion in such a manner as to oppose a rear surface of the half mirror, and an adhesive-injecting recessed passage extending from the pocket to an open end of the groove portion is formed in the bottom surface of the groove portion, that a bottom of the pocket is closed by a positioning base which is formed on the bottom surface of the groove portion to abut against the rear surface of the half mirror, and that a recessed portion is formed by cutting off portions other than the pocket at the bottom surface of the groove portion, the adhesive-injecting recessed passage, and the positioning base, thereby forming a pair of protrusions extending from the open end of the groove portion to the positioning base along both side edges of the adhesive-injecting recessed passage, wherein an adhesive is injected to two spots respectively located between the other end portion of the half mirror and the positioning seat and in the pocket so as to bond the half mirror to the housing.

According to the above-described construction, the half mirror is bonded at two spots by the adhesive, and as compared with the conventional three-spot bonding, the amount of bonding is small, so that it is possible to minimize the possibility of the half mirror being pulled by the shrinking force due to the curing of the adhesive and becoming offset from its predetermined position.

In addition, the rear surface of the half mirror can be reliably bonded to the bottom surface of the groove portion by the adhesive injected into the pocket. Since the adhesive is accumulated in the pocket and does not flow out to the outside, the half mirror is not pulled by the shrinking force due to the curing of the adhesive which otherwise flows out to the outside in the conventional case, so that the half mirror can be accurately fixed at its predetermined position.

Further, the adhesive can be injected simply and reliably into the pocket through the adhesive-injecting recessed passage.

Furthermore, the half mirror can be positioned, as required, by simply causing the rear surface of the half mirror to abut against the positioning base, and the positioning base is also used to close the bottom of the pocket. Hence, the structure is simplified by the jointly used portion, so that the fabrication cost can be lowered.

Moreover, since the recessed portion is formed by cutting off portions other than the pocket at the bottom surface of the groove portion, the adhesive-injecting recessed passage, and the positioning base, the weight can be lowered by the portion corresponding to the recessed portion, thereby making it possible to attain a cost reduction. Further, the adhesive injected into the pocket can be reliably prevented from flowing out to the outside by the pair of the protrusions extending from the open end of the groove portion to the positioning base along both side edges of the adhesive-injecting recessed passage.

The invention according to aspect 2 is characterized in that a retaining seat and a positioning seat are respectively formed on both side surfaces of a light-passing groove portion provided in a housing, and that one end portion of a half mirror is made to abut against the retaining seat, while another end portion of the half mirror is made to abut against the positioning seat, so as to dispose the half mirror in such a manner as to diagonally traverse the groove portion, wherein an adhesive is injected to two spots respectively located between the other end portion of the half mirror and the positioning seat and between a rear surface of the half mirror and a bottom surface of the groove portion so as to bond the half mirror to the housing.

According to the above-described construction, the half mirror is bonded at two spots by the adhesive, and as compared with the conventional three-spot bonding, the amount of bonding is small, so that it is possible to minimize the possibility of the half mirror being pulled by the shrinking force due to the curing of the adhesive and becoming offset from its predetermined position.

The invention according to aspect 3 is characterized in that, in the optical pickup according to aspect 2, a pocket is formed in the bottom surface of the groove portion in such a manner as to oppose the rear surface of the half mirror, and the rear surface of the half mirror and the bottom surface of the groove portion are bonded by the adhesive injected into the pocket.

According to the above-described construction, the rear surface of the half mirror can be reliably bonded to the bottom surface of the groove portion by the adhesive injected into the pocket. Since the adhesive is accumulated in the pocket and does not flow out to the outside, the half mirror is not pulled by the shrinking force due to the curing of the adhesive which otherwise flows out to the outside in the conventional case, so that the half mirror can be accurately fixed at its predetermined position.

The invention according to aspect 4 is characterized in that, in the optical pickup according to aspect 3, an adhesive-injecting recessed passage extending from an open end of the groove portion to the pocket is formed in the bottom surface of the groove portion.

According to the above-described construction, the adhesive can be injected simply and reliably into the pocket through the adhesive-injecting recessed passage.

The invention according to aspect 5 is characterized in that, in the optical pickup according to aspect 3 or 4, a positioning base for abutting against the rear surface of the half mirror to position the half mirror is formed on the bottom surface of the groove portion, and a bottom of the pocket is closed by the positioning base.

According to the above-described construction, the half mirror can be positioned, as required, by simply causing the rear surface of the half mirror to abut against the positioning base, and the positioning base is also used to close the bottom of the pocket. Hence, the structure is simplified by the jointly used portion, so that the fabrication cost can be lowered.

The invention according to aspect 6 is characterized in that, in the optical pickup according to aspect 5, a recessed portion is formed by cutting off portions other than the pocket at the bottom surface of the groove portion, the adhesive-injecting recessed passage, and the positioning base, thereby forming a pair of protrusions extending from the open end of the groove portion to the positioning base along both side edges of the adhesive-injecting recessed passage According to the above-described construction, since the recessed portion is formed by cutting off portions other than the pocket at the bottom surface of the groove portion, the adhesive-injecting recessed passage, and the positioning base, the weight can be lowered by the portion corresponding to the recessed portion, thereby making it possible to attain a cost reduction. Further, the adhesive injected into the pocket can be reliably prevented from flowing out to the outside by the pair of the protrusions extending from the open end of the groove portion to the positioning base along both side edges of the adhesive-injecting recessed passage.

DETAILED DESCRIPTION OF THE PREFERED EMODIMENTS

FIGS. 1 to 4 show an optical pickup in accordance with an embodiment of the invention. A pocket 10 is formed in a bottom surface 2a of a groove portion 2 in such a manner as to oppose a rear surface 3a of a half mirror 3, and an adhesive-injecting recessed passage 11 extending from the pocket 10 to an open end of the groove portion 2 is formed in the bottom surface 2a of the groove portion 2. Further, the bottom of the pocket 10 is closed by a positioning base 12 which is formed on the bottom surface 2a of the groove portion 2 to abut against the rear surface 3a of the half mirror 3, and a recessed portion 13 is formed by cutting off portions other than the pocket 10 at the bottom surface 2a of the groove portion 2, the adhesive-injecting recessed passage 11, and the positioning base 12. Consequently, a pair of protrusions 14 are formed which extend from the open end of the groove portion 2 to the positioning base 12 along both side edges of the adhesive-injecting recessed passage 11. An ultraviolet curing adhesive 8 is injected to two spots respectively located between the other end portion 3c of the half mirror 3 and a positioning seat 7 and in the pocket 10 so as to bond the half mirror 3 to a housing 1. Since the other arrangements are substantially similar to those shown in FIGS. 5 to 8, identical portions will be denoted by the same reference numerals, and description thereof will be omitted.

To describe the procedure of fixing the half mirror 3, the rear surface 3a of the half mirror 3 is made to abut against the positioning base 12, and one end portion 3b thereof is made to abut against an inclined side surface 6a and an inclined end surface 6b of a retaining seat 6. Meanwhile, the other end portion 3c of the half mirror 3 is made to abut against an inclined side surface 7a of the positioning seat 7. The half mirror 3 is thereby positioned in the groove portion 2 in a state of being inclined 45 degrees. Next, the ultraviolet curing adhesive 8 is injected into the pocket 10 through the adhesive-injecting recessed passage 11, the ultraviolet curing adhesive 8 is injected between the other end portion 3c of the half mirror 3 and the positioning seat 7, and ultraviolet rays are applied to cure the adhesive 8.

According to the above-described construction, since the rear surface 3a and the other end portion of the half mirror 3 are bonded to the housing 1 by the adhesive 8, the half mirror 3 can be reliably prevented from moving unexpectedly in the left-and-right directions a and b, back-and-forth directions c and d, and vertical directions e and f. In this case, the half mirror 3 is bonded at two spots by the adhesive, and as compared with the conventional three-spot bonding, the amount of bonding is small, so that it is possible to minimize the possibility of the half mirror 3 being pulled by the shrinking force due to the curing of the adhesive 8 and becoming offset from its predetermined position.

In addition, the rear surface 3a of the half mirror 3 can be reliably bonded to the bottom surface 2a of the groove portion 2 by the adhesive 8 injected into the pocket 10. Since the adhesive 8 is accumulated in the pocket 10 and does not flow out to the outside, the half mirror 3 is not pulled by the shrinking force due to the curing of the adhesive 8 which otherwise flows out to the outside in the conventional case, so that the half mirror 3 can be accurately fixed at its predetermined position.

Further, the adhesive 8 can be injected simply and reliably into the pocket 10 through the adhesive-injecting recessed passage 11.

Furthermore, the half mirror 3 can be positioned, as required, by simply causing the rear surface 3a of the half mirror 3 to abut against the positioning base 12, and the positioning base 12 is also used to close the bottom of the pocket 10. Hence, the structure is simplified by the jointly used portion, so that the fabrication cost can be lowered.

Moreover, since the recessed portion 13 is formed by cutting off portions other than the pocket 10 at the bottom surface 2a of the groove portion 2, the adhesive-injecting recessed passage 11, and the positioning base 12, the weight can be lowered by the portion corresponding to the recessed portion 13, thereby making it possible to attain a cost reduction. Further, the adhesive 8 injected into the pocket 10 can be reliably prevented from flowing out to the outside by the pair of the protrusions 14 extending from the open end of the groove portion 2 to the positioning base 12 along both side edges of the adhesive-injecting recessed passage 11.

In accordance with the invention according to aspect 1, the half mirror is bonded at two spots by the adhesive, and as compared with the conventional three-spot bonding, the amount of bonding is small, so that it is possible to minimize the possibility of the half mirror being pulled by the shrinking force due to the curing of the adhesive and becoming offset from its predetermined position.

In addition, the rear surface of the half mirror can be reliably bonded to the bottom surface of the groove portion by the adhesive injected into the pocket. Since the adhesive is accumulated in the pocket and does not flow out to the outside, the half mirror is not pulled by the shrinking force due to the curing of the adhesive which otherwise flows out to the outside in the conventional case, so that the half mirror can be accurately fixed at its predetermined position.

Further, the adhesive can be injected simply and reliably into the pocket through the adhesive-injecting recessed passage.

Furthermore, the half mirror can be positioned, as required, by simply causing the rear surface of the half mirror to abut against the positioning base, and the positioning base is also used to close the bottom of the pocket. Hence, the structure is simplified by the jointly used portion, so that the fabrication cost can be lowered.

Moreover, since the recessed portion is formed by cutting off portions other than the pocket at the bottom surface of the groove portion, the adhesive-injecting recessed passage, and the positioning base, the weight can be lowered by the portion corresponding to the recessed portion, thereby making it possible to attain a cost reduction. Further, the adhesive injected into the pocket can be reliably prevented from flowing out to the outside by the pair of the protrusions extending from the open end of the groove portion to the positioning base along both side edges of the adhesive-injecting recessed passage.

In accordance with the invention according to aspect 2, the half mirror is bonded at two spots by the adhesive, and as compared with the conventional three-spot bonding, the amount of bonding is small, so that it is possible to minimize the possibility of the half mirror being pulled by the shrinking force due to the curing of the adhesive and becoming offset from its predetermined position.

In accordance with the invention according to aspect 3, the rear surface of the half mirror can be reliably bonded to the bottom surface of the groove portion by the adhesive injected into the pocket. Since the adhesive is accumulated in the pocket and does not flow out to the outside, the half mirror is not pulled by the shrinking force due to the curing of the adhesive which otherwise flows out to the outside in the conventional case, so that the half mirror can be accurately fixed at its predetermined position.

In accordance with the invention according to aspect 4, the adhesive can be injected simply and reliably into the pocket through the adhesive-injecting recessed passage.

In accordance with the invention according to aspect 5, the half mirror can be positioned, as required, by simply causing the rear surface of the half mirror to abut against the positioning base, and the positioning base is also used to close the bottom of the pocket. Hence, the structure is simplified by the jointly used portion, so that the fabrication cost can be lowered.

In accordance with the invention according to aspect 6, since the recessed portion is formed by cutting off portions other than the pocket at the bottom surface of the groove portion, the adhesive-injecting recessed passage, and the positioning base, the weight can be lowered by the portion corresponding to the recessed portion, thereby making it possible to attain a cost reduction. Further, the adhesive injected into the pocket can be reliably prevented from flowing out to the outside by the pair of the protrusions extending from the open end of the groove portion to the positioning base along both side edges of the adhesive-injecting recessed passage.

What is claimed is:

1. An optical pickup comprising:
   a retaining seat having an inclined side surface and an inclined end surface, which are disposed in such a manner as to oppose each other in an L-shape, said retaining seat being formed on one side surface of a light-passing groove portion provided in a housing,
   a positioning seat having an inclined side surface, which is flush with the inclined side surface of said retaining seat, said positioning seat being formed on another side surface of the groove portion,
   a half mirror of which one end portion is made to abut against the inclined side surface and the inclined end surface of said retaining seat, while another end portion thereof is made to abut against the inclined side surface of said positioning seat, so as to dispose said half mirror in such a manner as to diagonally traverse the groove portion,
   a pocket formed in a bottom surface of the groove portion in such a manner as to oppose a rear surface of said half mirror, wherein
   an adhesive-injecting recessed passage extending from said pocket to an open end of the groove portion is formed in the bottom surface of the groove portion,
   a bottom of said pocket is closed by a positioning base which is formed on the bottom surface of the groove portion to abut against the rear surface of said half mirror,
   a recessed portion is formed by cutting off portions other than said pocket at the bottom surface of the groove portion, the adhesive-injecting recessed passage, said positioning base, to form a pair of protrusions extending from the open end of the groove portion to said positioning base along both side edges of said adhesive-injecting recessed passage, and
   an adhesive is injected to two spots respectively located between said other end portion of said half mirror and said positioning seat and in said pocket to bond said half mirror to said housing.

2. An optical pickup comprising:
   a retaining seat, and
   a positioning seat, which are respectively formed on both side surfaces of a light-passing groove portion provided in a housing, and
   a half mirror of which one end portion is made to abut against said retaining seat, while another end portion thereof is made to abut against said positioning seat, so as to dispose said half mirror in such a manner as to diagonally traverse said groove portion, wherein
   an adhesive is injected to two spots respectively located between said other end portion of said half mirror and said positioning seat and between a rear surface of said half mirror and a bottom surface of said groove portion so as to bond said half mirror to said housing.

3. The optical pickup according to claim 2, further comprising:
   a pocket formed in the bottom surface of the groove portion in such a manner as to oppose the rear surface of said half mirror, wherein
   the rear surface of said half mirror and the bottom surface of the groove portion are bonded by the adhesive injected into said pocket.

4. The optical pickup according to claim 3, wherein
   an adhesive-injecting recessed passage extending from an open end of the groove portion to said pocket is formed in the bottom surface of the groove portion.

5. The optical pickup according to claim 3, further comprising:
   a positioning base for abutting against the rear surface of said half mirror to position said half mirror formed on the bottom surface of the groove portion, wherein
   a bottom of said pocket is closed by said positioning base.

6. The optical pickup according to claim 5, wherein
   a recessed portion is formed by cutting off portions other than said pocket at the bottom surface of said groove portion, said adhesive-injecting recessed passage, and said positioning base, to form a pair of protrusions extending from the open end of the groove portion to said positioning base along both side edges of said adhesive-injecting recessed passage.

* * * * *